A. L. COWEN.
Horse-Hay Forks.
No. 157,497.
Patented Dec. 8, 1874.
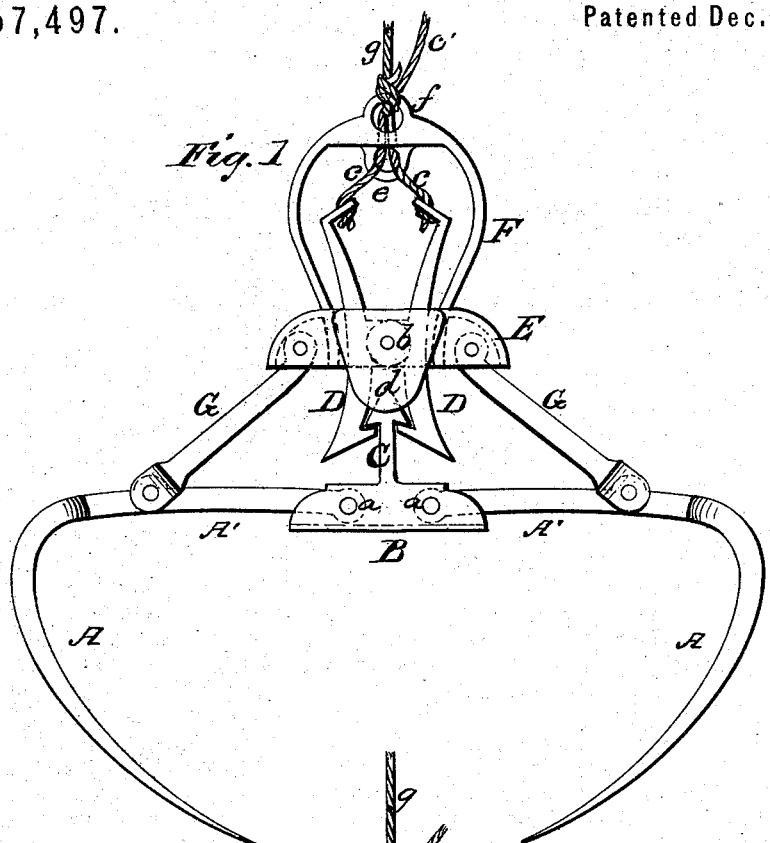
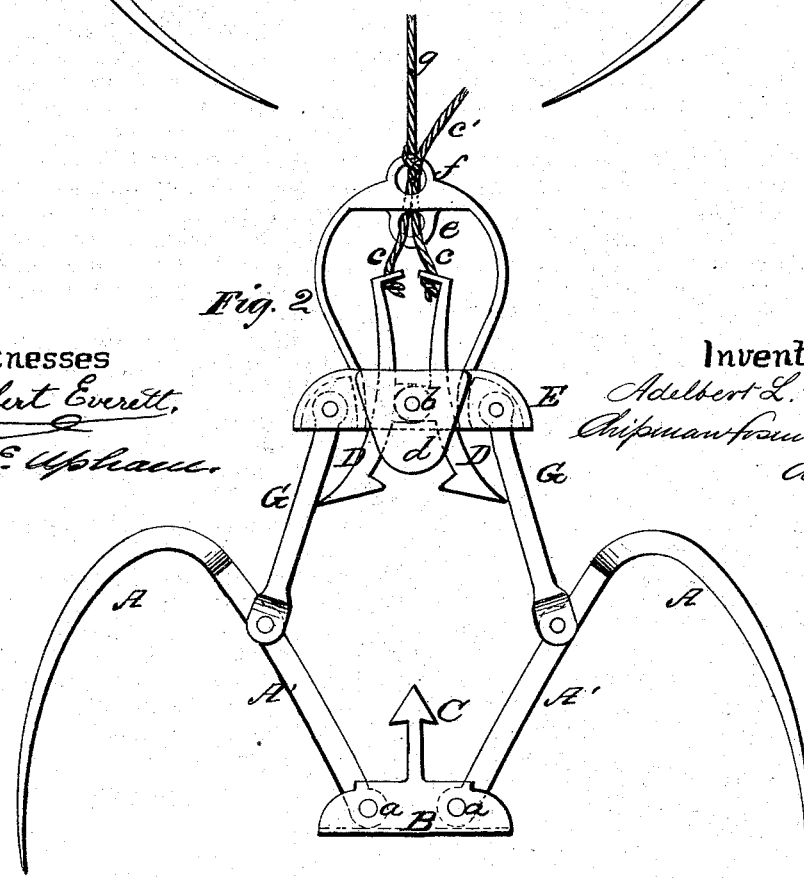
Witnesses
Robert Everett
Geo. E. Upham
Inventor.
Adelbert L. Cowen
Chipman Hosmer & Co
Attys

UNITED STATES PATENT OFFICE.

ADELBERT L. COWEN, OF CORNING, NEW YORK.

IMPROVEMENT IN HORSE HAY-FORKS.

Specification forming part of Letters Patent No. 157,497, dated December 8, 1874; application filed April 11, 1874.

*To all whom it may concern:*

Be it known that I, ADELBERT L. COWEN, of Corning, in the county of Steuben and State of New York, have invented a new and valuable Improvement in Horse Hay-Forks; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of my horse hay-fork.

This invention has relation to grappling hay-forks, which are designed to elevate hay from wagons and deliver it into barns, wherein two jointed grappling-forks are used, which will embrace the load to be elevated while in the act of being inserted.

The nature of my invention and improvement on forks of this kind consists in jointing the shanks of both forks to a cross-bar, on which is formed an arrow-head, in combination with jointed arms, a cross-head having a loop formed on it, by which the fork is suspended by means of a rope, and two catches, which are pivoted to said cross-head and adapted to engage with said arrow-head, as will be hereinafter explained.

In the annexed drawings, A A represent the tines of a hay-fork, which are respectively formed on the shanks A' A'. The shanks of these tines are pivoted at $a\,a$ to a cross-bar, B, on which is an arrow-headed catch, C, which catch is formed on a shank rising perpendicularly from the bar B, equidistant from the pivots $a\,a$. D D designate two catches, which are pivoted to a cross-head, E, at $b$. The lower ends of the catches D D are beveled and hooked to receive and hold the arrow-head C on the bar B. The upper arms of these catches have eyes on them, to which are attached two branches, $c\,c$, of a tripping-rope, $c'$, which pass through an eye, $e$, formed on a suspension-loop, F. The catches D D are pivoted at the middle of the length of the bar E, from which point depend two ears, $d$. The object of these ears is to positively guide the arrow-head C between the hooks of the catches D, and to prevent lateral displacement of said arrow-head during the elevation of a load. The loop F is formed rigidly on the cross-head E, and has an eye, $f$, through its upper extremity, to which is attached the rope by which the fork is suspended, elevated, and lowered. The cross-head E is connected to the shanks A' A' of the tines A A by means of arms G G, which are respectively jointed to said cross-head and shanks in such manner that when the arrow-head C is released from its catches D D the combined weight of this cross-bar and its arrow-head B will cause the same to descend and the several parts to assume the position indicated by Fig. 2. In this position of the parts we press the tines into a mass of hay until the cross-bar B impinges upon the mass, which affords a fulcrum thereon, and by a continued pressure the tines A A are forced downward and caused to approximate to each other, thereby embracing and at the same time compressing the load to be elevated, and engaging the arrow-head C with the two catches D D, thus retaining the load between the tines under compression.

The load is now ready to be elevated. When the load is elevated and carried to the desired place the load can be discharged by pulling upon the tripping-rope $c'$. The fork then assumes the position indicated in Fig. 2, by reason of the gravitation of the cross-bar B and its arrow-head C.

What I claim, and desire to secure by Letters Patent, is—

The hay-fork having the shanks A' of the curved tines pivoted to the rigid arrow-head C, and the arms G pivoted to the middle part of said shanks and to the cross-head E, carrying the pivotal catch-hooks D, as specified.

In testimony that I claim the above I have hereunto subscribed my name in the presence of two witnesses.

ADELBERT L. COWEN.

Witnesses:
S. O. MASTERS,
J. S. ROBINSON.